United States Patent
Onimaru et al.

(10) Patent No.: US 8,119,027 B2
(45) Date of Patent: Feb. 21, 2012

(54) GREEN PHOSPHOR AND PLASMA DISPLAY PANEL

(75) Inventors: Toshiaki Onimaru, Miyazaki (JP); Shinya Fukuta, Miyazaki (JP); Shigeo Kasahara, Miyazaki (JP)

(73) Assignee: Hitachi Plasma Display Limited, Tokyo (JP)

( * ) Notice: Subject to any disclaimer, the term of this patent is extended or adjusted under 35 U.S.C. 154(b) by 764 days.

(21) Appl. No.: 12/160,778

(22) PCT Filed: Jan. 13, 2006

(86) PCT No.: PCT/JP2006/300384
§ 371 (c)(1),
(2), (4) Date: Jul. 11, 2008

(87) PCT Pub. No.: WO2007/080649
PCT Pub. Date: Jul. 19, 2007

(65) Prior Publication Data
US 2010/0213414 A1    Aug. 26, 2010

(51) Int. Cl.
*C09K 11/81* (2006.01)
*H01J 11/02* (2006.01)

(52) U.S. Cl. .......... 252/301.4 R; 252/301.4 F; 313/582; 313/486; 313/584

(58) Field of Classification Search ........... 252/301.4 R, 252/301.4 F, 301.6 R, 301.6 F; 313/582, 313/486, 584
See application file for complete search history.

(56) References Cited

U.S. PATENT DOCUMENTS

| | | | | |
|---|---|---|---|---|
| 7,300,605 | B2 * | 11/2007 | Fukuta et al. | 252/301.4 R |
| 2001/0020696 | A1 | 9/2001 | Srivastava et al. | |
| 2005/0161639 | A1 * | 7/2005 | Fukuta et al. | 252/301.4 R |

FOREIGN PATENT DOCUMENTS

| | | |
|---|---|---|
| JP | 05-086366 A | 4/1993 |
| JP | 2001-139942 A | 5/2001 |

OTHER PUBLICATIONS

Sommerdijk et al. "The behaviour of phosphors with aluminate host lattices", Philips Technical Review, vol. 37, 1977, No. 9/10, pp. 221-223.

Tamatani "Fluorescence in β-$Al_2O_3$-Like Materials of K, Ba and La Activated with $Eu^{2+}$ and $Mn^{2+}$", Japanese Journal of Applied Physics, vol. 13, No. 6, Jun. 1973, pp. 950-956.

Sommerdijk et al., "Concentration Dependence of the $Ce^{3+}$ and $Tb^{3+}$ Luminescence of $Ce_{1-x}Tb_xMgAl_{11}O_{19}$", Journal of Luminescence, vol. 9, No. 5, Dec. 1974, pp. 415-419.

* cited by examiner

*Primary Examiner* — Carol M Koslow
(74) *Attorney, Agent, or Firm* — Miles & Stockbridge P.C.

(57) ABSTRACT

A green phosphor represented by Formula $(A_{1-x}Tb_x)_a(B_{1-y}Mn_y)_bC_cO_{b+1.5(a+c)}$, wherein A includes La, and Yb and/or Gd, B includes at least one kind selected from Mg, Zn, Sc, V, Cr, Co, Ni, Cu, In, Zr, Nb, Ta, Mo, and Sn, C includes at least one selected from Al, B, Ga, Si, P, Ti, Fe, B, and Ge, $0 \leq x \leq 1$, $0 \leq y \leq 1$, $0.8 \leq a \leq 1.2$, $0 < b \leq 1.5$, $8 \leq c \leq 30$, and having a magnetoplumbite type crystal structure.

6 Claims, 4 Drawing Sheets

GREEN PHOSPHOR AND PLASMA DISPLAY PANEL

TECHNICAL FIELD

The present invention relates to a green phosphor and a plasma display panel. More particularly, the present invention relates to a green phosphor and a plasma display panel having improved characteristics.

BACKGROUND ART

For example, as a green phosphor that is excised by vacuum ultraviolet light, $Zn_2SiO_4$:Mn is well known. This phosphor is advantageous in a high chromaticity (chromaticity coordinates: x=0.21, y=0.72), and a high luminescent efficiency. However, it has the problem that luminance changes fast with time and the life time is short.

As another green phosphor, $BaAl_{12}O_{19}$:Mn is known. This phosphor also has high color purity and luminescent efficiency, however, it has the problem of short life time.

As a phosphor that improves both the life time and luminescent efficiency, there is known a phosphor in which a rare earth element and transition metal are added concurrently as a luminescent center to crystals having a magnetoplumbite type structure. Concretely, $LaAl_{11}O_{19}$:$Eu^{2+}$, Mn (JJAP, 13 (1974) pp. 950-956: Non-patent document 1), $SrAl_{12}O_{19}$:La, $Eu^{2+}$, Mn (Philips Technical Review, 37 (1977) pp. 221-233: Non-patent document 2), $SrAl_{12}O_{19}$:Mn, Ln (Ln: trivalent rare earth element) (Japanese Unexamined Patent Publication No. 2001-139942: Patent document 1) can be recited. In these phosphors, energy moves from the rare earth element to Mn, and more green luminescence is obtained compared to a phosphor only of Mn.

As an intensifying element for intensifying luminescence from Tb, Ce is often used. As a phosphor containing Ce, $CeMgAl_{11}O_{19}$:Tb is described in J. L. Sommerdijk AND J. M. P. J. Verstegen: J. Luminescence, 9 (1974) pp 415-419 (Non-patent document 3) or in J. L. Sommerdijk AND A. L. N. Stevels: Philips Technical Review, 37 (1977) pp 221-233 (Non-patent document 4) and the like. This is because energy transits from Ce to Tb at a high efficiency since a luminescent energy level of Ce is almost the same with fd transition energy of Tb. The excited Tb emits visible light based on transition from 5DJ to 7FJ'. A green main peak at a wavelength of about 540 nm resulting from transition from 5D4 to 7F5, a blue sub peak at a wavelength of about 480 nm resulting from transition from 5D4 to 7F6, a yellow sub peak at a wavelength of about 580 nm resulting from transition from 5D4 to 7F4, and a red sub peak at a wavelength of about 600 nm resulting from transition from 5D4 to 7F3 are obtained. A CIE color coordinate of luminescence of this phosphor is about (0.31, 0.61). A y component of this color coordinates represents a green component. In luminescence using Tb like $CeMgAl_{11}O_{19}$:Tb, however, a y value is lower by 0.1 or more, compared to a color coordinate (0.21, 0.72) of $Zn_2SiO_4$:Mn, and a color coordinate (0.15, 0.73) of $BaMgAl_{14}O_{23}$:Mn. In other words, a color purity of green is significantly low, and is not appropriate for a display device.

A phosphor represented by $(Ce_{1-x}Tb_x)(Mg_{1-a-b}Zn_aMn_b)Al_{2a}O_{2.5+3a}$ (provided that $0<x\leq0.6$, $0<a+b<1$, $4.5\leq z\leq15$) which is coactivated with Mn and Tb is described in Japanese Unexamined Patent Publication No. HEI 5 (1997)-86366 (Patent document 2). This phosphor has a spectrum in which Mn luminescence is added to luminescent light of Tb. Therefore, the chromaticity is improved compared to the aforementioned phosphor, however, there is still a problem that the luminescence amount by vacuum ultraviolet excitation is inferior by about 20% compared with $Zn_2SiO_4$:Mn.

Patent document 1: Japanese Unexamined Patent Publication No. 2001-139942
Patent document 2: Japanese Unexamined Patent Publication No. HEI 5 (1997)-86366
Non-patent document 1: JJAP, 13 (1974) pp. 950-956
Non-patent document 2: Philips Technical Review, 37 (1977) pp. 221-233
Non-patent document 3: J. L. Sommerdijk AND J. M. P. J. Verstegen:J. Luminescence, 9 (1974) pp 415-419
Non-patent document 4: J. L. Sommerdijk AND A. L. N. Stevels: Philips Technical Review, 37 (1977) pp 221-233

DISCLOSURE OF THE INVENTION

Problem to be Solved by the Invention

To provide a green phosphor having improved luminance, phosphorescence characteristic and lifetime while ensuring color purity.

Means for Solving the Problem

According to the present invention, there is provided a green phosphor represented by Formula $(A_{1-x}Tb_x)_a(B_{1-y}Mn_y)_bC_cO_{b+1.5(a+c)}$, wherein A includes La, and Yb and/or Gd, B includes at least one kind selected from Mg, Zn, Sc, V, Cr, Co, Ni, Cu, In, Zr, Nb, Ta, Mo, and Sn, C includes at least one selected from Al, B, Ga, Si, P, Ti, Fe, B, and Ge, $0\leq x\leq1$, $0\leq y\leq1$, $0.8\leq a\leq1.2$, $0<b\leq1.5$, $8\leq c\leq30$, and having a magnetoplumbite type crystal structure.

Also, according to the present invention, there is provided a plasma display panel using the above green phosphor.

EFFECT OF THE INVENTION

According to the present invention, it is possible to provide a green phosphor having an excellent color purity, luminance, phosphorescence characteristic and life time characteristic.

| EXPLANATION OF REFERENCE NUMERALS | |
|---|---|
| 11, 21 | substrate |
| 17 | dielectric layer |
| 18 | protective layer |
| 27 | insulating layer |
| 28 | phosphor layer |

-continued

| | EXPLANATION OF REFERENCE NUMERALS |
|---|---|
| 29 | rib |
| 41 | transparent electrode |
| 42 | bus electrode |
| 100 | PDP |
| A | address electrode |

BEST MODE FOR CARRYING OUT THE INVENTION

The green phospho of the present invention is represented by Formula $(A_{1-x}Tb_x)_a(B_{1-y}Mn_y)_bC_cO_{b+1.5(a+c)}$, and has a magnetoplumbite type crystal structure. In the above formula, x, y, a, b and c represent atomic ratios.

In the above formula, as A, an element having an ion diameter ranging from about 1 to 1.3 angstroms, which is easily substituted by Tb is preferably used, as B, an element having an ion diameter ranging from about 0.65 to 0.9 angstrom, which is easily substituted by Mn is preferably used, and as C, an element having an ion diameter ranging from about 0.4 to 0.64 angstrom is preferably used. Ion diameters of elements that are preferably used as A, B and C are shown in Table 1.

TABLE 1

| A | ion diameter (Å) | B | ion diameter (Å) | C | ion diameter (Å) |
|---|---|---|---|---|---|
| La3+ | 1.22 | Mg2+ | 0.72 | Al3+ | 0.54 |
| Y3+ | 1.08 | Sc3+ | 0.75 | B3+ | 0.27 |
| Ce4+ | 1.2 | V3+ | 0.64 | Si4+ | 0.4 |
| Pr3+ | 1.18 | Co3+ | 0.65 | P3+ | 0.44 |
| Nd3+ | 1.16 | Ni2+ | 0.69 | Cr3+ | 0.62 |
| Sm3+ | 1.13 | Cu+ | 0.77 | Ti4+ | 0.61 |
| Eu3+ | 1.12 | Zn2+ | 0.74 | Fe3+ | 0.55 |
| Gd3+ | 1.11 | In3+ | 0.8 | Ga3+ | 0.62 |
| Dy3+ | 1.08 | Sn4+ | 0.69 | Ge3+ | 0.53 |
| Ho3+ | 1.07 | Zr4+ | 0.72 | | |
| Er3+ | 1.06 | Nb3+ | 0.72 | | |
| Tm3+ | 1.05 | Mo3+ | 0.69 | | |
| Yb3+ | 1.04 | Ta3+ | 0.72 | | |
| Lu3+ | 1.03 | W4+ | 0.66 | | |

In the above formula, A includes La, and Yb and/or Gd. Besides these elements, A may further include Tm, Dy, Ce, Lu, Y or a combination of these elements. Among these elements, elements other than La that are preferred to be included in A are Tm, Dy, Ce, Lu, and Y. B is at least one kind of element selected from Mg, Zn, Sc, V, Cr, Co, Ni, Cu, In, Zr, Nb, Ta, Mo, and Sn, and a plurality of kinds may be selected. Preferred examples of B include Mg, V, and Ta. Further, C is at least one kind of element selected from Al, B, Ga, Si, P, Ti, Fe, B, and Ge, and a plurality of kinds may be selected. Preferred examples of C include Al, Ti, and Si. It is particularly preferred that B is Mg, and C is Al.

In the above formula, a range of x is 0 to 1, and preferably 0.3 to 0.5. A range of y is 0 to 1, and preferably 0.01 to 0.1. Further, A range of a is 0.8 to 1.2, and preferably 0.9 to 1.1. Further, A range of b is larger than 0 and 1.5 or less, and preferably 0.8 to 1.2. Further, A range of c is 8 to 30, and preferably 10 to 13.

As a concrete example of the green phosphor, a phosphor represented by formula $(La_{1-x1-m-n}Tb_{x1}Yb_mGd_n)(Mg_{1-y}Mn_y)Al_{11}O_{19}$ can be recited. In this formula, both a and b are 1.

In the above formula, a range of x1 is 0 to 0.6, and preferably 0.3 to 0.5. A range of y is 0 to 0.1, and preferably 0.01 to 0.07. A range of m is 0 to 0.1, and preferably 0.001 to 0.01. A range of n is larger than 0 and 1 or less, and preferably 0.2 to 0.6. A range of x+m+n is larger than 0 and less than 1. The range of x+m+n is preferably 0.2 to 0.8.

Further, Ti, V, Ta, Tm, Dy, Ce, Lu, Y and Si may be added in the range of 0.00003 to 0.01 to the above concrete green phosphor.

The green phosphor of the present invention may be formed by a known method. For example, compounds containing elements constituting a base material and activating elements are weighed so that a desired molar ratio is achieved. These compounds are burnt. Then, the obtained burnt material of the phosphor is ground and classified, to obtain a phosphor having a predetermined particle size. After grinding and classifying, further burning may be conducted.

A condition of burning is appropriately adjusted depending on kinds of elements, and in general, the condition is under an inert atmosphere (for example, nitrogen atmosphere) or under a reductive atmosphere (for example, hydrogen atmosphere) at 1300 to 1600° C., for 1 to 10 hours in an atmospheric pressure. For lowering the burning temperature, halides such as $AlF_3$, $MgF_2$, LiF, NaF and the like, or reaction promoters containing oxides having low melting points such as $B_2O_3$, $P_2O_5$ and the like may be used within the range that will not interfere the effect of the present invention.

The green phosphor of the present invention may be used as fluorescent lumps, illumination devices such as a backlight of a liquid display device, and display devices such as a plasma display panel (PDP), a CRT, a fluorescent display tube, an X-ray imaging tube and the like. The following is description about an example in which the green phosphor of the present invention is applied to a PDP of FIG. 1.

Figure 1:
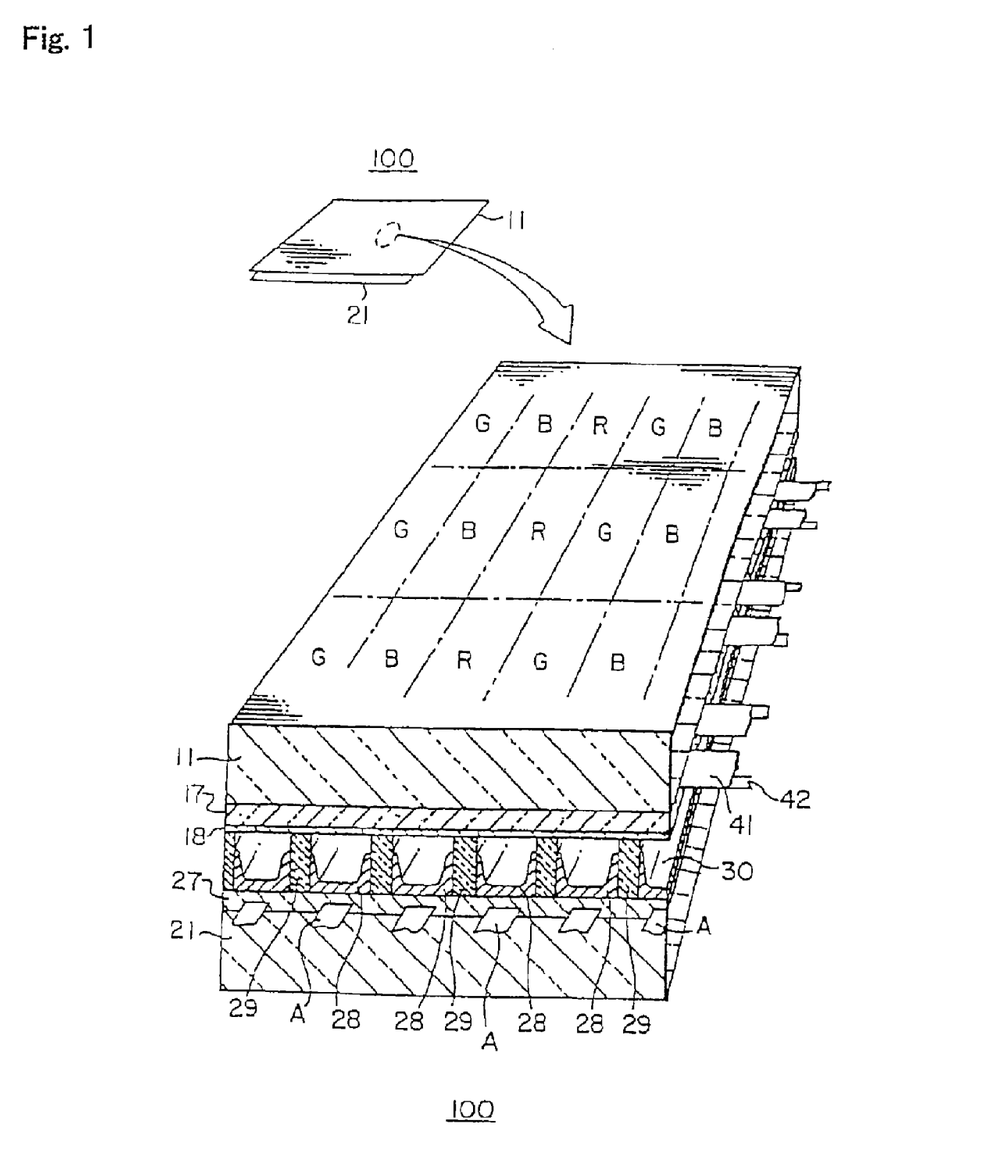
FIG. 1 is a schematic perspective view of a PDP.

The PDP of FIG. 1 is a tri-electrode AC-type surface discharge PDP. The present invention may be applied to any configuration insofar as it is a PDP including a green phosphor without limited to this PDP. For example, it may be applied to any PDP including a DC type without limited to an AC type, and a reflective type without limited to a transmissive type.

The PDP 100 of FIG. 1 is made up of a front substrate and a back substrate.

First, the front substrate generally includes a plurality of display electrodes formed on a substrate 11, a dielectric layer 17 formed to cover the display electrodes, and a protective layer 18 formed on the dielectric layer 17 and exposed to discharging space. Examples of the substrate 11 include, but are not limited to, a glass substrate, a quartz glass substrate, a silicon substrate, and the like.

The display electrode is formed of a transparent electrode 41 such as ITO. Further, in order to lower resistance of the display electrode, a bus electrode (for example, triple layer structure of Cr/Cu/Cr) 42 may be formed on the transparent electrode 41.

The dielectric layer 17 is formed of a material that is generally used in the PDP. Concretely, it may be formed by applying a paste containing low melting point glass and a binder on a substrate, followed by burning.

The protective layer 18 is provided for protecting the dielectric layer 17 from damage by collision of ions due to discharging during display. The protective layer 18 is made of, for example, MgO, CaO, SrO, BaO and the like.

Next, the back substrate generally includes a plurality of address electrodes A formed in the direction crossing with the above display electrodes on a substrate 21, an insulating layer 27 covering the address electrodes A, a plurality of ribs 29 in the form of stripes formed on the insulating layer 27 between adjacent address electrodes A, and a phosphor layer 28 formed between the ribs 29 to include a wall face.

As the substrate 21 and the insulating layer 27, those similar to the substrate 11 and the dielectric layer 17 forming the aforementioned front substrate may be used.

The address electrode A is formed of for example, a metal layer of Al, Cr, Cu or the like, or a triple layer structure of Cr/Cu/Cr.

The rib 29 may be formed by cutting by a sand blast method, after applying a paste containing low melting point glass and a binder on the insulating layer 27, and drying the same. It may be formed by burning after exposure to light and development using a mask of a predetermined shape when a photosensitive resin is used as a binder.

In FIG. 1, the phosphor layer 28 is formed between the ribs 29, and the green phosphor of the present invention may be used as a material of this phosphor layer 28. A method of forming the phosphor layer 28 is not particularly limited, and known methods may be employed. For example, a paste in which phosphors are dispersed in a solution of a binder dissolved in a solvent is applied between the ribs 29, and burnt in an air atmosphere, to thereby form the phosphor layer 28. For obtaining a full color PDP, red and blue phosphors are required, however, known phosphor may be used as these phosphors without any limitation.

Then, the front substrate and the back substrate are placed to face each other so that the display electrodes (41, 42) and the address electrodes A cross at right angles, and both electrodes are inside, and the discharging space 30 surrounded by the ribs 29 are filled with discharging gas, and thus the PDP 100 can be formed.

In the above PDP, among the ribs, an insulating layer, a dielectric layer and a protective layer defining the discharging space 30, the phosphor layer is formed on the rib and the insulating layer of the back substrate. However, the phosphor layer may be formed on the protective film of the front substrate in the same manner.

EXAMPLES

In the following, examples of the present invention will be described. The present invention will not be limited to the following examples. In the examples, a 0.1 second decay time is a value measured by a gate circuit photon counter by controlling excimer lump light with the use of a pulse generator. Chromaticity and luminance are the values measured by a spectral radiant luminometer using an eximer lump as a light source.

Example 1

Effect of Adding Yb

Green phosphors a to d shown below were produced.
Phosphor a: $(La_{0.65}Tb_{0.35})(Mg_{0.97}Mn_{0.03})Al_{11}O_{19}$
Phosphor b: $(La_{0.647}Tb_{0.35}Yb_{0.003})(Mg_{0.97}Mn_{0.03})Al_{11}O_{19}$
Phosphor c: $(La_{0.64}Tb_{0.35}Yb_{0.01})(Mg_{0.97}Mn_{0.03})Al_{11}O_{19}$
Phosphor d: $(La_{0.62}Tb_{0.35}Yb_{0.03})(Mg_{0.97}Mn_{0.03})Al_{11}O_{19}$ The materials shown in Table 2 were added to an appropriate amount of ethanol, and mixed for 3 hours. Then, the mixture was retained at 1400° C. for 4 hours under an atmospheric pressure in a mixed atmosphere of hydrogen and nitrogen. After grinding, the sample was retained again at 1400° C. for 4 hours under an atmospheric pressure in a mixed atmosphere of hydrogen and nitrogen, to give phosphors a to d.

TABLE 2

| | phosphor (Molar ratio) | | | |
|---|---|---|---|---|
| Material | a | b | c | d |
| $Al_2O_3$ | 11 | 11 | 11 | 11 |
| MgO | 0.97 | 0.97 | 0.97 | 0.97 |
| $La_2O_3$ | 0.65 | 0.547 | 0.64 | 0.62 |
| $Tb_4O_7$ | 0.35 | 0.35 | 0.35 | 0.35 |
| $MnCO_3$ | 0.03 | 0.03 | 0.03 | 0.03 |
| $Yb_2O_3$ | 0 | 0.003 | 0.01 | 0.03 |
| $MgF_2$ | 0.015 | 0.015 | 0.015 | 0.015 |

In the table 2, the molar ratio means an atomic ratio of Al, Mg, La, Tb, Mn or Yb.

Luminance and phosphorescence time by an excitation light having a wavelength of 146 nm) were measured for phosphors shown in Table 2. Table 3 shows luminescent acteristic with respect to a Yb adding concentration in $LaMgAl_{11}O_{19}$: 3% Mn, 35% Tb, and FIG. 2 shows a correlation between luminance and phosphorescence with respect to the Yb adding concentration.

TABLE 3

| phosphor | Yb (%) | chromaticity coordinate X | chromaticity coordinate Y | relative luminance | post-decisecond relative phosphorescence |
|---|---|---|---|---|---|
| a | 0 | 0.239 | 0.672 | 1.000 | 1.000 |
| b | 0.3 | 0.243 | 0.669 | 0.972 | 0.625 |
| c | 1 | 0.246 | 0.666 | 0.926 | 0.290 |
| d | 3 | 0.253 | 0.659 | 0.843 | 0.163 |

Figure 2:
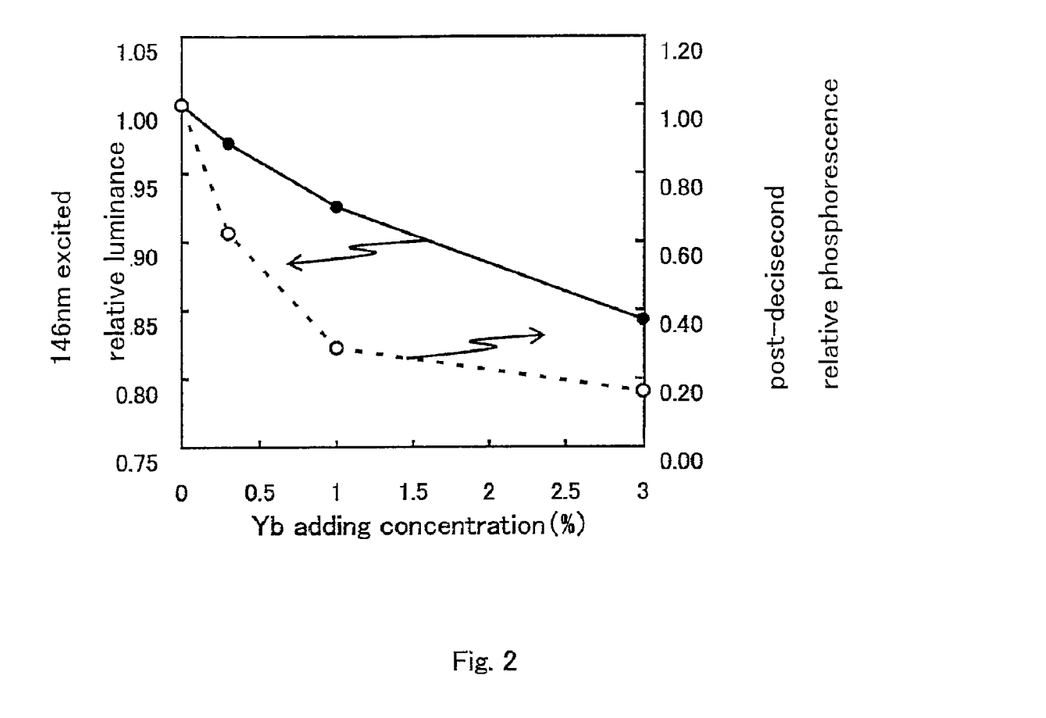
FIG. 2 is a graph for showing a correlation between luminance and phosphorescence with respect to the Yb adding concentration of the phosphor in Example 1.

Table 3 and FIG. 2 reveal that phosphorescence can be improved as the Yb adding concentration increases. The degree of improvement in phosphorescence is large, and relative phosphorescence is about 63% when the Yb adding concentration is 0.3%. This demonstrates that by adding Yb to $LaMgAl_{11}O_{19}$:3% Mn, 35% Tb, it is possible to reduce a phosphorescence value by about 37% or more compared to the initial value without leading little deterioration in luminance.

Example 2

Effect of Adding Gd

The following phosphors e to g were produced in the same manner as in Example 1 except that materials shown in Table 4 were used.
Phosphor a: $(La_{0.65}Tb_{0.35})(Mg_{0.97}Mn_{0.03})Al_{11}O_{19}$
Phosphor e: $(La_{0.55}Tb_{0.35}Gd_{0.1})(Mg_{0.97}Mn_{0.03})Al_{11}O_{19}$
Phosphor f: $(La_{0.45}Tb_{0.35}Gd_{0.2})(Mg_{0.97}Mn_{0.03})Al_{11}O_{19}$
Phosphor g: $(La_{0.35}Tb_{0.35}Gd_{0.3})(Mg_{0.97}Mn_{0.03})Al_{11}O_{19}$

TABLE 4

| | phosphor (Molar ratio) | | | |
|---|---|---|---|---|
| Material | a | e | f | g |
| $Al_2O_3$ | 11 | 11 | 11 | 11 |
| MgO | 0.97 | 0.97 | 0.97 | 0.97 |
| $La_2O_3$ | 0.65 | 0.55 | 0.45 | 0.35 |
| $Tb_4O_7$ | 0.35 | 0.35 | 0.35 | 0.35 |
| $MnCO_3$ | 0.03 | 0.03 | 0.03 | 0.03 |

TABLE 4-continued

| Material | phosphor (Molar ratio) | | | |
|---|---|---|---|---|
| | a | e | f | g |
| $Gd_2O_3$ | 0 | 0.1 | 0.2 | 0.3 |
| $MgF_2$ | 0.015 | 0.015 | 0.015 | 0.015 |

Luminance and phosphorescence time by an excitation source of vacuum ultraviolet ray (specifically, light having a wavelength of 146 nm) were measured for phosphors shown in Table 4. Table 5 shows luminescent characteristic with respect to a Gd adding concentration in $LaMgAl_{11}O_{19}$:3% Mn, 35% Tb, and FIG. 3 shows a correlation between luminance and phosphorescence with respect to the Gd adding concentration.

TABLE 5

| phosphor | Gd (%) | chromaticity coordinate X | chromaticity coordinate Y | relative luminance | post-decisecond relative phosphorescence |
|---|---|---|---|---|---|
| a | 0 | 0.239 | 0.672 | 1.000 | 1.000 |
| e | 10 | 0.241 | 0.670 | 1.080 | 1.028 |
| f | 20 | 0.244 | 0.669 | 1.109 | 0.914 |
| g | 30 | 0.245 | 0.669 | 1.117 | 0.842 |

Figure 3:
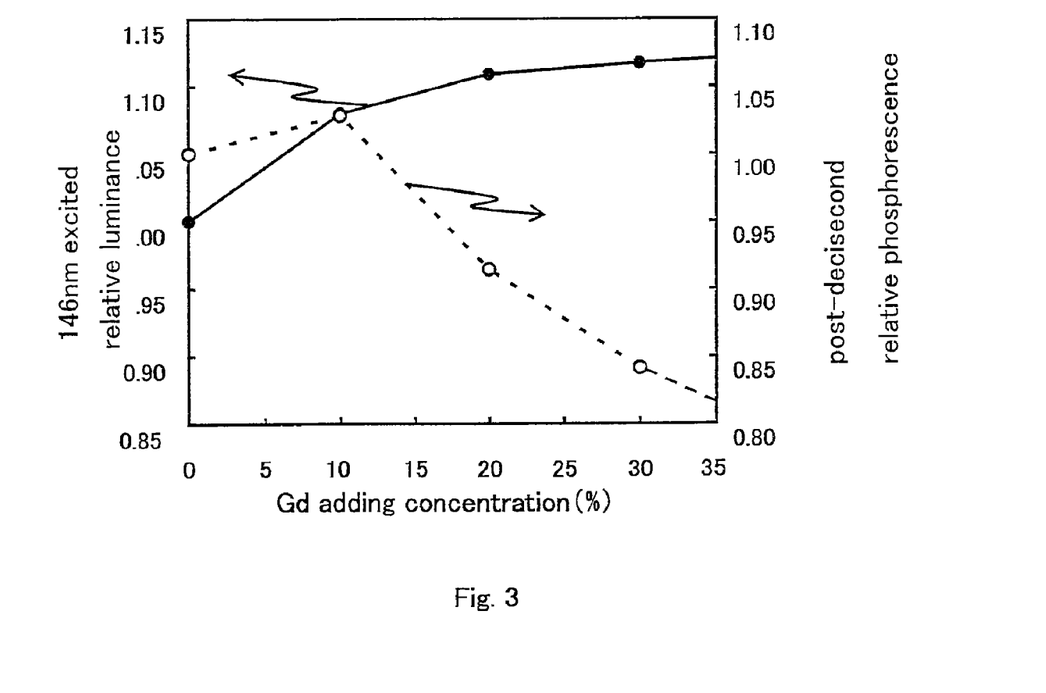
FIG. 3 is a graph for showing a correlation between luminance and phosphorescence with respect to the Gd adding concentration of the phosphor in Example 2.

Table 5 and FIG. 3 reveal that both luminance and phosphorescence can be improved by increasing the Gd adding concentration. For example, when the Gd adding concentration is 30%, a relative luminance is about 112%, and a relative phosphorescence is about 84%. This demonstrates that by adding Gd to $LaMgAl_{11}O_{19}$:3% Mn, 35% Tb, it is possible to increase luminance by about 12% or more, and reduce a phosphorescence value by about 37% or more compared to the initial values.

Example 3

Effect of Adding Yb and Gd

The following phosphors h to m were produced in the same manner as in Example 1 except that materials shown in Table 6 were used.

Phosphor a: $(La_{0.65}Tb_{0.35})(Mg_{0.97}Mn_{0.03})Al_{11}O_{19}$
Phosphor h: $(La_{0.547}Tb_{0.35}Yb_{0.003}Gd_{0.1})(Mg_{0.97}Mn_{0.03})Al_{11}O_{19}$
Phosphor i: $(La_{0.447}Tb_{0.35}Yb_{0.003}Gd_{0.2})(Mg_{0.97}Mn_{0.03})Al_{11}O_{19}$
Phosphor j: $(La_{0.347}Tb_{0.35}Yb_{0.003}Gd_{0.3})(Mg_{0.97}Mn_{0.03})Al_{11}O_{19}$
Phosphor k: $(La_{0.247}Tb_{0.35}Yb_{0.003}Gd_{0.4})(Mg_{0.97}Mn_{0.03})Al_{11}O_{19}$
Phosphor l: $(La_{0.147}Tb_{0.35}Yb_{0.003}Gd_{0.5})(Mg_{0.97}Mn_{0.03})Al_{11}O_{19}$
Phosphor m: $(La_{0.047}Tb_{0.35}Yb_{0.003}Gd_{0.6})(Mg_{0.97}Mn_{0.03})Al_{11}O_{19}$

TABLE 6

| Material | phosphor (Molar ratio) | | | | | | |
|---|---|---|---|---|---|---|---|
| | a | h | i | j | k | l | m |
| $Al_2O_3$ | 11 | 11 | 11 | 11 | 11 | 11 | 11 |
| MgO | 0.97 | 0.97 | 0.97 | 0.97 | 0.97 | 0.97 | 0.97 |
| $La_2O_3$ | 0.65 | 0.547 | 0.447 | 0.347 | 0.247 | 0.147 | 0.047 |
| $Tb_4O_7$ | 0.35 | 0.35 | 0.35 | 0.35 | 0.35 | 0.35 | 0.35 |
| $MnCO_3$ | 0.03 | 0.03 | 0.03 | 0.03 | 0.03 | 0.03 | 0.03 |
| $Yb_2O_3$ | 0 | 0.003 | 0.003 | 0.003 | 0.003 | 0.003 | 0.003 |
| $Gd_2O_3$ | 0 | 0.1 | 0.2 | 0.3 | 0.4 | 0.5 | 0.6 |
| $MgF_2$ | 0.015 | 0.015 | 0.015 | 0.015 | 0.015 | 0.015 | 0.015 |

Luminance and phosphorescence time by an excitation source of vacuum ultraviolet ray (specifically, light having a wavelength of 146 nm) were measured for phosphors shown in Table 6. Table 7 shows luminescent characteristic with respect to a Gd adding concentration in $LaMgAl_{11}O_{19}$:3% Mn, 35% Tb, 0.3% Yb and FIG. 4 shows correlation between luminance and phosphorescence with respect to the Gd adding concentration.

TABLE 7

| phosphor | Yb (%) | Gd (%) | chromaticity coordinate X | chromaticity coordinate Y | relative luminance | post-decisecond relative phosphorescence |
|---|---|---|---|---|---|---|
| a | 0 | 0 | 0.239 | 0.672 | 1.000 | 1.000 |
| h | 0.3 | 10 | 0.240 | 0.671 | 1.028 | 0.488 |
| i | 0.3 | 20 | 0.242 | 0.670 | 1.083 | 0.439 |
| j | 0.3 | 30 | 0.244 | 0.669 | 1.088 | 0.367 |
| k | 0.3 | 40 | 0.248 | 0.666 | 1.119 | 0.297 |
| l | 0.3 | 50 | 0.251 | 0.665 | 1.142 | 0.300 |
| m | 0.3 | 60 | 0.242 | 0.674 | 1.134 | 0.385 |

Figure 4:
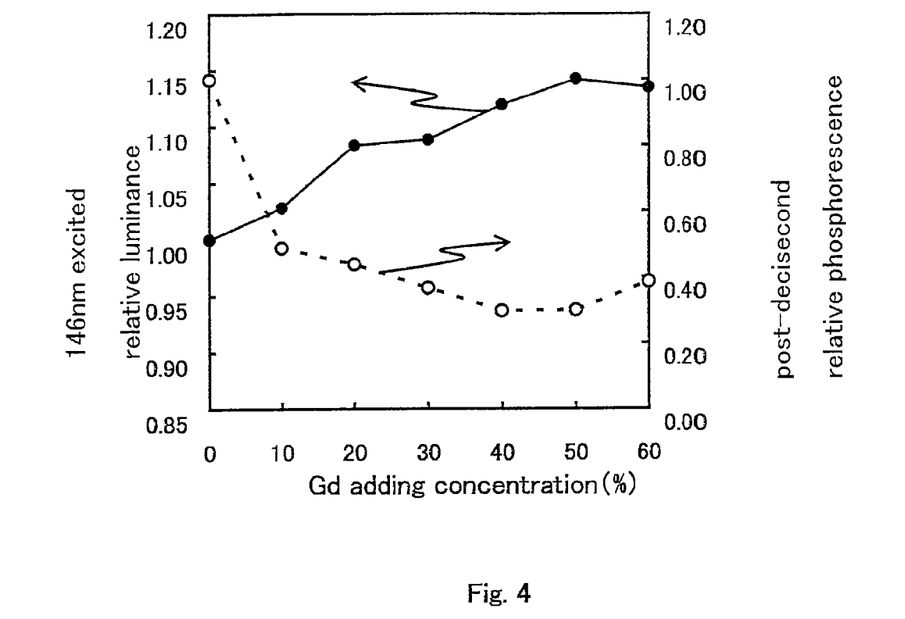
FIG. 4 is a graph for showing a correlation between luminance and phosphorescence with respect to the Gd adding concentration of the phosphor in Example 3.

Table 7 and FIG. 4 reveal that luminance is improved as the Gd adding concentration increases, and the improvement is saturated at about 50%. When the Gd adding concentration is 50%, a relative luminance is about 114% or larger. It is also reveled that phosphorescence is reduced according to the Gd adding concentration. When the Gd adding concentration is 50%, a relative phosphorescence is about 30% or larger. In this manner, by adding both Yb and Gd to $LaMgAl_{11}O_{19}$:3% Mn, 35% Tb, it is possible to increase a luminance by about 14% or more, and a reduce phosphorescence value by about 70% or more compared to the initial values.

Figure 5:
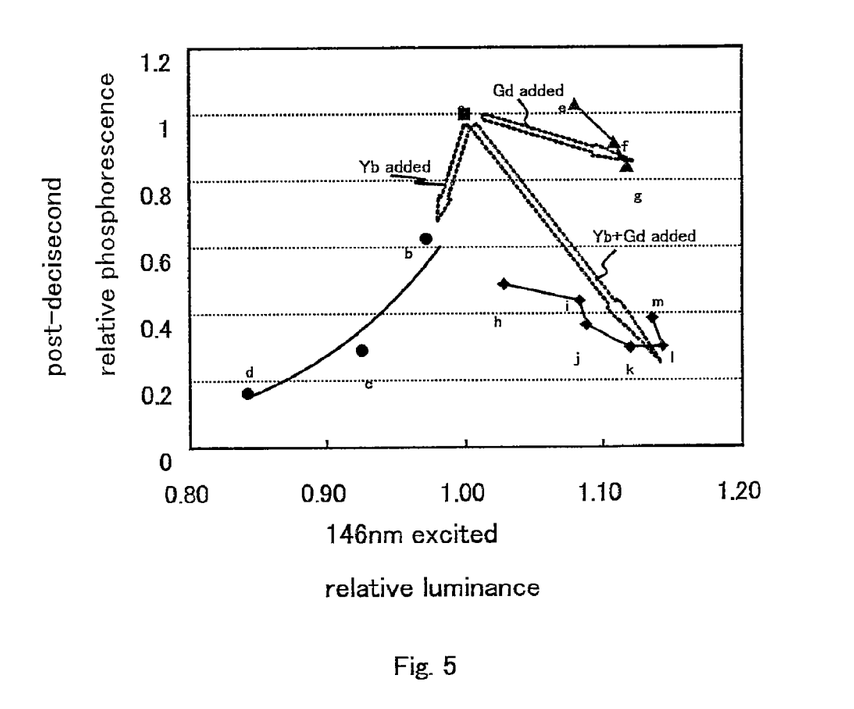
FIG. 5 is a graph for collectively showing correlations between the relative luminance and the relative phosphorescence in Examples 1 to 3.

Next, correlations between the relative luminance and the relative phosphorescence in Examples 1 to 3 are collectively shown in FIG. 5. It is found that in Example 1, phosphorescence, in particular, can be proved by adding Yb. It is found that in Example 2, both luminance and phosphorescence can be improved by adding Gd. Examples 1 and 2 demonstrate that Yb has larger phosphorescence improving effect than Gd. Further, Example 3 demonstrates that by adding both Yb and Gd, luminance and phosphorescence can be largely improved.

Example 4

Life-Time of Phosphor Containing Both Yb and Gd

Using the phosphor i ($LaMgAl_{11}O_{19}$:3% Mn, 35% Tb, 0.3% Yb, 20% Gd), the phosphor k ($LaMgAl_{11}O_{19}$:3% Mn, 35% Tb, 0.3% Yb, 40% Gd) and $Zn_2SiO_4$:Mn (Mn 8%), a PDP having the structure as illustrated in FIG. 1 was manufactured. Conditions of members forming the PDP are shown below.

Figure 6:
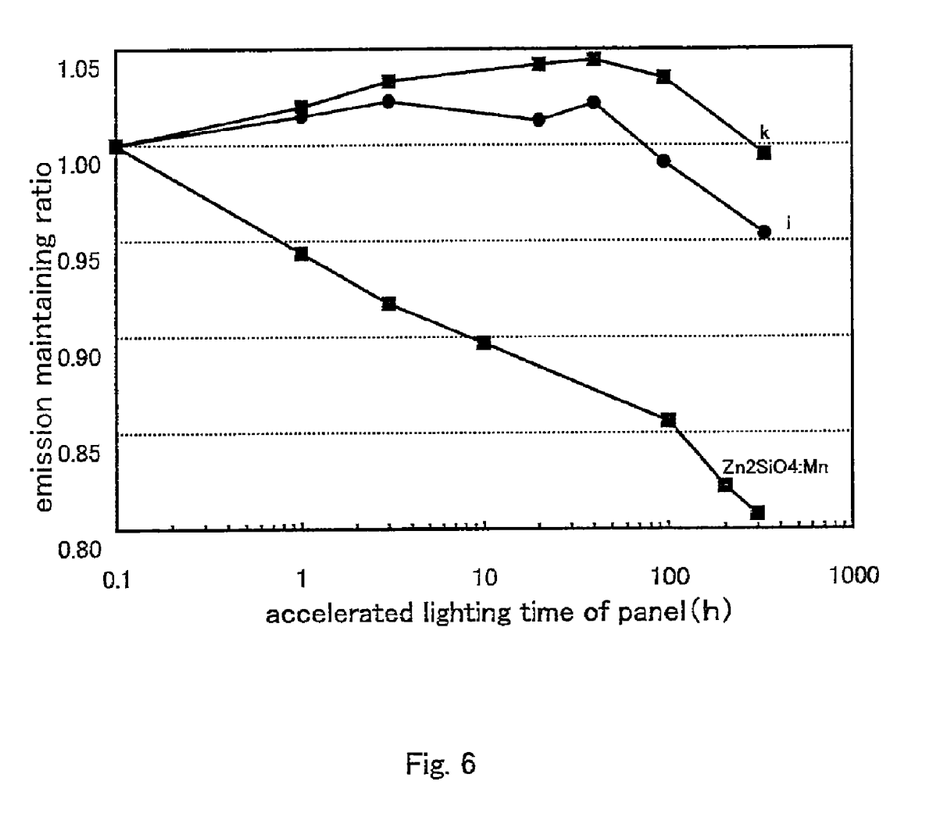
FIG. 6 is a graph for showing measurement results of an accelerated life test of phosphors in a PDP of Example 4.

Display Electrode
  Width of transparent electrode: 280 μm
  Width of bus electrode: 100 μm
  Discharge gap between display electrodes 100 μm
  Thickness of dielectric layer 30 μm
  Height of rib 100 μm
  Arrangement pitch of ribs 360 μm
  Discharge gas of Ne—Xe(5%)-He(30%)
  Gas pressure 450 Torr FIG. 6 shows measurement results of an accelerated life test of phosphors in a PDP. It can be found that the phosphor i and the phosphor k have a longer life time compared to $Zn_2SiO_4$:Mn.

Example 5 (Effect of adding Ti, V, Ta, Tm, Dy, Ce, Lu, Y or Si)

The following phosphors n1 to v3 were produced in the same manner as in Example 1. As the materials for adding Ti, V, Ta, Tm, Dy, Ce, Lu, Y, and Si to a phosphor, $TiO_2$, $V_2O_3$, $Ta_2O_3$, $TM_2O_3$, $Dy_2O_3$, $CeO_2$, $Lu_2O_3$, $Y_2O_3$, and $SiO_2$ were respectively used.

Luminance and phosphorescence time by an excitation source of vacuum ultraviolet ray (specifically, light having a wavelength of 146 nm) were measured for the obtained phosphors. Tables 7 to 15 show luminescent characteristics in $LaMgAl_{11}O_{19}$:3% Mn, 35% Tb, 0.3% Yb, 20% Gd, with respect to an adding concentration of Ti, V, Ta, Tm, Dy, Ce, Lu, Y or Si.

TABLE 8

| phosphor | Yb (%) | Gd (%) | Ti (%) | chromaticity coordinate X | chromaticity coordinate Y | relative luminance | post-decisecond relative phosphorescence |
|---|---|---|---|---|---|---|---|
| a | 0 | 0 | 0 | 0.239 | 0.672 | 1.000 | 1.000 |
| i | 0.3 | 20 | 0 | 0.245 | 0.669 | 1.094 | 0.543 |
| n1 | 0.3 | 20 | 0.003 | 0.245 | 0.669 | 1.104 | 0.513 |
| n2 | 0.3 | 20 | 0.01 | 0.245 | 0.669 | 1.047 | 0.423 |
| n3 | 0.3 | 20 | 0.03 | 0.246 | 0.668 | 1.013 | 0.260 |
| n4 | 0.3 | 20 | 0.1 | 0.249 | 0.665 | 0.885 | 0.121 |
| n5 | 0.3 | 20 | 0.3 | 0.255 | 0.658 | 0.611 | 0.068 |

TABLE 9

| phosphor | Yb (%) | Gd (%) | V (%) | chromaticity coordinate X | chromaticity coordinate Y | relative luminance | post-decisecond relative phosphorescence |
|---|---|---|---|---|---|---|---|
| a | 0 | 0 | 0 | 0.239 | 0.672 | 1.000 | 1.000 |
| i | 0.3 | 20 | 0 | 0.245 | 0.669 | 1.094 | 0.543 |
| o1 | 0.3 | 20 | 0.003 | 0.245 | 0.669 | 1.109 | 0.484 |
| o2 | 0.3 | 20 | 0.01 | 0.245 | 0.668 | 1.057 | 0.400 |
| o3 | 0.3 | 20 | 0.03 | 0.246 | 0.667 | 0.942 | 0.215 |
| o4 | 0.3 | 20 | 0.1 | 0.250 | 0.664 | 0.767 | 0.067 |

TABLE 10

| phosphor | Yb (%) | Gd (%) | Ta (%) | chromaticity coordinate X | chromaticity coordinate Y | relative luminance | post-decisecond relative phosphorescence |
|---|---|---|---|---|---|---|---|
| a | 0 | 0 | 0 | 0.239 | 0.672 | 1.000 | 1.000 |
| i | 0.3 | 20 | 0 | 0.245 | 0.669 | 1.094 | 0.543 |
| p1 | 0.3 | 20 | 0.01 | 0.245 | 0.669 | 1.057 | 0.645 |
| p2 | 0.3 | 20 | 0.03 | 0.244 | 0.669 | 1.059 | 0.661 |

TABLE 10-continued

| phosphor | Yb (%) | Gd (%) | Ta (%) | chromaticity coordinate X | chromaticity coordinate Y | relative luminance | post-decisecond relative phosphorescence |
|---|---|---|---|---|---|---|---|
| p3 | 0.3 | 20 | 0.1 | 0.245 | 0.669 | 1.086 | 0.634 |
| p4 | 0.3 | 20 | 0.3 | 0.246 | 0.667 | 1.043 | 0.599 |
| p5 | 0.3 | 20 | 1 | 0.247 | 0.667 | 1.002 | 0.472 |

TABLE 11

| phosphor | Yb (%) | Gd (%) | Tm (%) | chromaticity coordinate X | chromaticity coordinate Y | relative luminance | post-decisecond relative phosphorescence |
|---|---|---|---|---|---|---|---|
| a | 0 | 0 | 0 | 0.239 | 0.672 | 1.000 | 1.000 |
| i | 0.3 | 20 | 0 | 0.245 | 0.669 | 1.094 | 0.543 |
| q1 | 0.3 | 20 | 0.3 | 0.245 | 0.667 | 1.015 | 0.445 |
| q2 | 0.3 | 20 | 0.6 | 0.246 | 0.667 | 0.985 | 0.361 |
| q3 | 0.3 | 20 | 1 | 0.247 | 0.666 | 0.915 | 0.285 |

TABLE 12

| phosphor | Yb (%) | Gd (%) | Dy (%) | chromaticity coordinate X | chromaticity coordinate Y | relative luminance | post-decisecond relative phosphorescence |
|---|---|---|---|---|---|---|---|
| a | 0 | 0 | 0 | 0.239 | 0.672 | 1.000 | 1.000 |
| i | 0.3 | 20 | 0 | 0.245 | 0.669 | 1.094 | 0.543 |
| r1 | 0.3 | 20 | 0.3 | 0.246 | 0.666 | 1.011 | 0.315 |
| r2 | 0.3 | 20 | 0.6 | 0.245 | 0.666 | 0.918 | 0.250 |
| r3 | 0.3 | 20 | 1 | 0.248 | 0.663 | 0.857 | 0.262 |

TABLE 13

| phosphor | Yb (%) | Gd (%) | Ce (%) | chromaticity coordinate X | chromaticity coordinate Y | relative luminance | post-decisecond relative phosphorescence |
|---|---|---|---|---|---|---|---|
| a | 0 | 0 | 0 | 0.239 | 0.672 | 1.000 | 1.000 |
| i | 0.3 | 20 | 0 | 0.245 | 0.669 | 1.094 | 0.543 |
| s1 | 0.3 | 20 | 0.3 | 0.244 | 0.669 | 1.094 | 0.648 |
| s2 | 0.3 | 20 | 0.6 | 0.244 | 0.668 | 1.056 | 0.574 |
| s3 | 0.3 | 20 | 1 | 0.244 | 0.669 | 1.013 | 0.498 |

TABLE 14

| phosphor | Yb (%) | Gd (%) | Lu (%) | chromaticity coordinate X | chromaticity coordinate Y | relative luminance | post-decisecond relative phosphorescence |
|---|---|---|---|---|---|---|---|
| a | 0 | 0 | 0 | 0.239 | 0.672 | 1.000 | 1.000 |
| i | 0.3 | 20 | 0 | 0.245 | 0.669 | 1.094 | 0.542 |
| t1 | 0.3 | 20 | 0.3 | 0.244 | 0.669 | 1.125 | 0.631 |
| t2 | 0.3 | 20 | 0.6 | 0.244 | 0.669 | 1.147 | 0.667 |
| t3 | 0.3 | 20 | 1 | 0.243 | 0.670 | 1.116 | 0.673 |

TABLE 15

| phosphor | Yb (%) | Gd (%) | Y (%) | chromaticity coordinate X | chromaticity coordinate Y | relative luminance | post-decisecond relative phosphorescence |
|---|---|---|---|---|---|---|---|
| a | 0 | 0 | 0 | 0.239 | 0.672 | 1.000 | 1.000 |
| i | 0.3 | 20 | 0 | 0.245 | 0.669 | 1.094 | 0.543 |
| u1 | 0.3 | 20 | 0.3 | 0.244 | 0.670 | 1.131 | 0.473 |
| u2 | 0.3 | 20 | 0.6 | 0.244 | 0.670 | 1.165 | 0.624 |
| u3 | 0.3 | 20 | 1 | 0.245 | 0.669 | 1.149 | 0.536 |

TABLE 16

| phosphor | Yb (%) | Gd (%) | Si (%) | chromaticity coordinate X | chromaticity coordinate Y | relative luminance | post-decisecond relative phosphorescence |
|---|---|---|---|---|---|---|---|
| a | 0 | 0 | 0 | 0.239 | 0.672 | 1.000 | 1.000 |
| i | 0.3 | 20 | 0 | 0.245 | 0.669 | 1.094 | 0.543 |
| v1 | 0.3 | 20 | 0.3 | 0.245 | 0.668 | 1.063 | 0.658 |
| v2 | 0.3 | 20 | 0.6 | 0.246 | 0.668 | 1.058 | 0.623 |
| v3 | 0.3 | 20 | 1 | 0.247 | 0.667 | 1.060 | 0.644 |

The above Tables 8 to 16 demonstrate that luminance and/or phosphorescence can be improved by containing Ti, V, Ta, Tm, Dy, Ce, Lu, Y or Si.

What is claimed is:

1. A green phosphor represented by Formula:

$$((La_{1-x1-m-n}Tb_{x1}Yb_m Gd_n)(Mg_{1-y}Mn_y)Al_{11}O_{19})_{1-z}A_z$$

wherein $0 \leq x1 \leq 0.6$, $0 \leq m \leq 0.1$, $0.1 < n \leq 1$, $0 < x1+m+n < 1$, $0 \leq y \leq 0.1$, $0.00003 \leq z \leq 0.01$, and having a magnetoplumbite type crystal structure, wherein A is at least one atom selected from the group consisting of Ti, V, Ta, Tm, Dy, Ce, Lu, Y and Si.

2. A green phosphor according to claim 1, wherein an excitation source of the green phosphor is a vacuum ultraviolet ray.

3. A green phosphor according to claim 1, wherein n ranges from 0.2 to 0.6.

4. A green phosphor represented by the following formula:

$$(La_{1-x1-m-n}Tb_{x1}Yb_m Gd_n)(Mg_{1-y}Mn_y)Al_{11}O_{19}$$

wherein $0 \leq x1 \leq 0.6$, $0 \leq m \leq 0.1$, $0 < n \leq 1$, $0 < x1+m+n < 1$, $0 \leq y \leq 0.1$.

5. A green phosphor according to claim 4, wherein n ranges from 0.2 to 0.6.

6. A plasma display device using a green phosphor as set forth in claim 1.

* * * * *